United States Patent
Naraki et al.

(10) Patent No.: US 6,471,615 B1
(45) Date of Patent: Oct. 29, 2002

(54) AUTOMATIC TRANSMISSION FOR VEHICLE

(75) Inventors: Tetsuo Naraki, Saitama (JP); Eiichiro Kawahara, Saitama (JP); Tsukasa Takahashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 16 days.

(21) Appl. No.: 09/675,012

(22) Filed: Sep. 29, 2000

(30) Foreign Application Priority Data

Dec. 15, 1999 (JP) ............................ 11-355252

(51) Int. Cl.$^7$ ................................. F16H 3/74
(52) U.S. Cl. ...................... 475/262; 475/121
(58) Field of Search ..................... 475/257, 258, 475/121, 205, 262, 293, 297, 299, 300

(56) References Cited

U.S. PATENT DOCUMENTS

| | | | |
|---|---|---|---|
| 5,263,906 A | * 11/1993 | Antonov | 475/257 |
| 5,409,428 A | * 4/1995 | Antonov | 475/258 |
| 5,514,043 A | 5/1996 | Antonov | |
| 5,514,044 A | * 5/1996 | Antonov | 475/257 |
| 5,993,346 A | * 11/1999 | Antonov | 475/258 |
| 6,159,128 A | * 12/2000 | Sasaki et al. | 477/143 |

FOREIGN PATENT DOCUMENTS

WO 92/07206 * 4/1992 ................. 475/257

* cited by examiner

*Primary Examiner*—Charles A Marmor
*Assistant Examiner*—Ha Ho
(74) *Attorney, Agent, or Firm*—Arent Fox Kintner Plotkin & Kahn PLLC

(57) ABSTRACT

An automatic transmission including an input shaft connected to an output shaft of an engine. A first clutch of a first planetary gear unit is positioned between the input and first output shafts while a third clutch of a third planetary gear unit is interposed between the second and third output shafts. Each of the first and third clutches are engaged by the action of flyweights operated by centrifugal force and disengaged by thrust exerted on helical gears of the planetary gear units. A second planetary gear unit includes a second clutch interposed between the first and the second output shafts. Control means control the second clutch so as to engage the first and the second output shaft or disengage the first and the second output shafts from each other and provide smooth shockless upshifting and downshifting of the automatic transmission.

4 Claims, 1 Drawing Sheet

AUTOMATIC TRANSMISSION FOR VEHICLE

BACKGROUND OF THE INVENTION

1. Field of the Invention

The present invention relates to an automatic transmission for a vehicle and, more particularly to an automatic transmission including planetary gear units each incorporating a centrifugal clutch.

2. Description of the Related Art

A known automatic transmission disclosed in U.S. Pat. No. 5,514,043 includes four planetary gear units of helical gears each incorporating a centrifugal clutch that is engaged by flyweights that are moved radially by centrifugal force and is disengaged by thrust exerted on the helical gears of the planetary gear unit. The four planetary gear units are connected in series. Each planetary gear unit has a ring gear mounted on an input shaft and serving as an input member, and a planet carrier mounted on an output shaft and serving as an output member. The centrifugal clutch is interposed between the ring gear and the planet carrier. The planetary gear unit is a two-speed transmission that reduces the rotating speed of the input shaft and lowers the rotating speed of the output shaft when the centrifugal clutch is disengaged, and rotates the input shaft and the output shaft at the same rotating speed for direct drive when the centrifugal clutch is engaged.

The four planetary gear units are connected in series to set the automatic transmission for a first speed by disengaging all the four centrifugal clutches, for a second speed by engaging one of the four centrifugal clutches, for a third speed by engaging two of the four centrifugal clutches, for a fourth speed by engaging three of the four centrifugal clutches and for a fifth speed by engaging all the four centrifugal clutches. When the automatic transmission is set for fifth speed by engaging all the four centrifugal clutches, the output shaft of the automatic transmission rotates at a rotating speed equal to that of the input shaft of the same to serve as a transmission of a gear ratio of 1 to 1.

When the automatic transmission is set for the highest speed, i.e., the fifth speed, the input shaft is connected directly to the output shaft for direct drive in which the rotating speed of the output shaft is equal to that of the input shaft. Therefore, this automatic transmission cannot function as an overdrive. Thus, the planetary gear units nearer to the output end of the automatic transmission must have greater torque capacities, and the component gears, clutches and bearings of those planetary gear units must bear considerably large load and hence must be formed in large units requiring large spaces for installation to secure necessary strength.

SUMMARY OF THE INVENTION

The present invention has been made in view of those problems and it is therefore an object of the present invention to provide a small multispeed automatic transmission for a vehicle employing planetary gear units of helical gears each including a centrifugal clutch that is engaged by the action of flyweights operated by centrifugal force and is disengaged by thrust exerted on the helical gears, and capable of functioning as an overdrive.

According to a first aspect of the present invention, an automatic transmission for a vehicle comprises: an input shaft connected to the output shaft of an engine; a first planetary gear unit including a helical sun gear, helical planet pinions supported for rotation on a planet carrier, and a helical ring gear, the sun gear (or the ring gear) being connected to the input shaft, the ring gear (or the sun gear) being connected through a one-way clutch to a fixed member such that the same can be restrained from rotation relative to the fixed member, the planet carrier being connected to a first output shaft; a first clutch interposed between the input shaft and the first output shaft, and capable of being engaged by the action of flyweights operated by centrifugal force and of being disengaged by thrust exerted on the helical gears; a second planetary gear unit including a sun gear, planet pinions supported for rotation on a planet carrier, and a ring gear, the planet carrier being connected to the first output shaft, the sun gear (or the ring gear) being connected to a second output shaft, the ring gear (or the sun gear) being connected through a one-way clutch to a fixed member such that the same can be restrained from rotation relative to the fixed member; a second clutch interposed between the first and the second output shaft, and capable of being controlled by a control means so as to engage the first and the second output shaft or disengage the first and the second output shaft from each other; a third planetary gear unit including a helical sun gear, a helical planet pinions supported for rotation on a planet carrier, and a ring gear, the sun gear (or the ring gear) being connected to the second output shaft, the ring gear (or the sun gear) being connected through a one-way clutch to a fixed member such that the same can be restrained from rotation relative to the fixed member; and a third clutch interposed between the second and the third output shaft, and capable of being engaged by the action of flyweights operated by centrifugal force and of being disengaged by thrust exerted on the helical gears.

Since the second planetary gear unit that operates as a two-speed gear unit capable of being set for either of a direct-drive speed and a step-up speed is interposed between the first planetary gear unit that operates as a two-speed gear unit capable of being set for either of a direct-drive speed and a reduction speed and the third planetary gear, the automatic transmission is capable of providing eight speeds including an overdrive speed.

Accordingly, the torque capacities of the component members on the lower side of the power transmission train may be small, load on the gears, clutches and bearings on the lower side of the power transmission train is reduced, so that the automatic transmission can be formed in a small, lightweight unit that can be installed in a small space.

Preferably, the control means engages the second clutch of the automatic transmission while the vehicle is stopped.

When the second clutch is engaged with the vehicle stopped on an uphill road, the transmission of a torque tending to turn the driving wheels of the vehicle in the reverse direction is prevented by the one-way clutch of the second planetary gear unit. Consequently, the backward movement of the vehicle can be prevented without requiring creep control and fuel consumption can be reduced.

Preferably, the automatic transmission further comprises a reversing mechanism mounted on the third output shaft.

When the reversing mechanism is mounted on the third output shaft disposed on the downstream side that may have a small torque capacity when the automatic transmission is set for an overdrive speed, load on a clutch, gears and bearings included in the reversing mechanism is reduced and the reversing mechanism can be formed in a small, lightweight unit.

BRIEF DESCRIPTION OF THE DRAWINGS

The above and other objects, features and advantages of the present invention will become more apparent from the following description taken in connection with the accompanying drawings.

DESCRIPTION OF THE PREFERRED EMBODIMENTS

Figure 1:
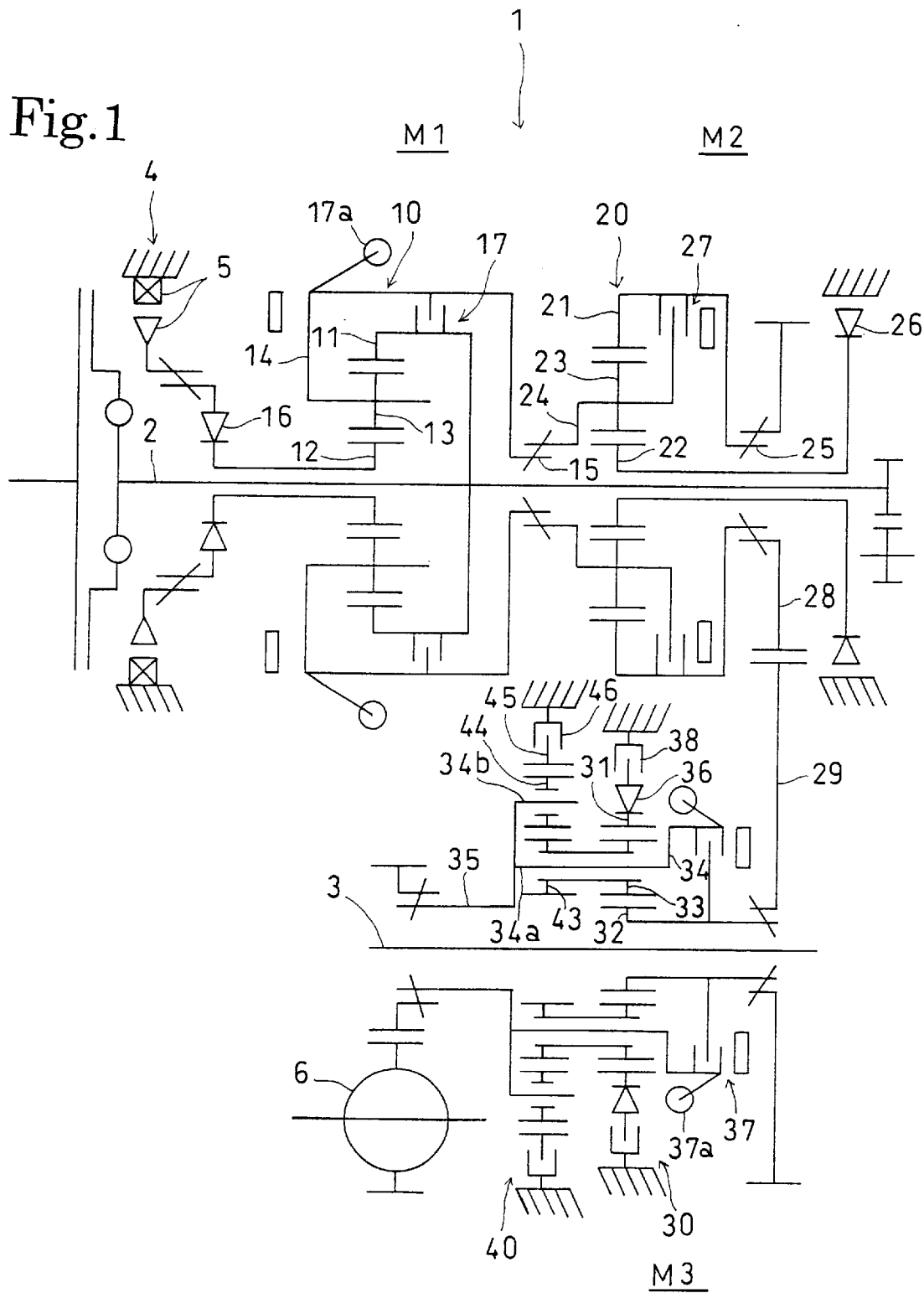
FIG. 1 is a diagrammatic view of an automatic transmission in a preferred embodiment according to the present invention for a front-engine front-drive vehicle.

Referring to FIG. 1 showing an automatic transmission 1 in a preferred embodiment according to the present invention for a front-engine front-drive vehicle (hereinafter referred to as "FF vehicle"), coaxially mounted in a sequential arrangement on an input shaft 2 for transmitting the output power of an internal combustion engine are an electromagnetic clutch 4, a first planetary gear unit 10 and a second planetary gear unit 20. A support shaft 3 is disposed in parallel to the input shaft 2. A third planetary gear unit 30 and a reverse drive unit 40 are mounted on the support shaft 3. The rotation of a third output shaft 35 included in the automatic transmission 1 is transmitted through a differential gear 6 to driving wheels.

The first planetary gear unit 10 includes a ring gear 11, a sun gear 12, planet pinions 13, which are helical gears. The ring gear 11 is fixedly mounted on the input shaft 2. The sun gear 12 supported on the input shaft 2 is coupled with a clutch disk 5 of the electromagnetic clutch 4 by a one-way clutch 16. The clutch disk 5 can be fastened to a stationary casing member. A planet carrier 14 supporting the planet pinions 13 is fixedly mounted on a first output shaft 15.

A first centrifugal clutch 17 is interposed between the planet carrier 14 and the ring gear 11. The first centrifugal clutch 17 is controlled by flyweights 17a supported on the planet carrier 14 so as to be moved by centrifugal force.

In a state where the electromagnetic clutch 4 is engaged and the first centrifugal clutch 17 is disengaged, the ring gear 11 rotates together with the input shaft 2, the planet pinions 13 rotate and revolve around the sun gear 12, which is allowed to rotate only in one direction by the one-way clutch 16, and thereby the planet carrier 14 rotates together with the first output shaft 15.

In a state where the first centrifugal clutch 17 is disengaged, the first output shaft 15 fixedly supporting the planet carrier 14 rotates at a rotating speed lower than that of the input shaft 2 fixedly supporting the ring gear 11 for a speed reduction mode; that is, the gear ratio a=(Output rotating speed)/(Input rotating speed)<1.

In a state where the first centrifugal clutch 17 is engaged, the input shaft 2 and the planet carrier 14 are engaged and the first output shaft 15 rotates at a rotating speed equal to that of the input shaft 2 for a direct drive mode.

The first centrifugal clutch 17 is engaged by centrifugal force acting on the flyweights 17a and is disengaged by thrust exerted on the helical gears of the first planetary gear unit The second planetary gear unit 20 includes a ring gear 21, a sun gear 22, and planet pinions 23 supported on a planet carrier 24. The ring gear 21 is fixedly united with a second output shaft 25. The sun gear 22 is connected through a one-way clutch 26 to a fixed casing member such that the same can be restrained from rotation relative to the fixed casing member. The planet carrier 24 supporting the planet pinions 23 is interlocked with the first output shaft 15 by splines.

A second hydraulic clutch 27 is interposed between the planet carrier 24 and the ring gear 21. An electromagnetic clutch may be used instead of the second hydraulic clutch 27. In a state where the second hydraulic clutch 27 is disengaged, the planet carrier 24 is rotated by the first output shaft 15, the sun gear 22 restrained from rotation in one of opposite directions by the one-way clutch 26 rotates the planet pinions 23, the planet pinions 23 revolve around the sun gear 22, and thereby the ring gear 21 engaging the planet pinions 23 rotates together with the second output shaft 25. In a state where the second hydraulic clutch 27 is disengaged, the second output shaft 25 fixedly connected to the ring gear 21 rotates at a rotating speed higher than that of the rotating speed of the planet carrier 24, i.e., input rotating speed; that is the speed ratio b=(Output rotating speed)/(Input rotating speed)>1.

In a state where the second hydraulic clutch 27 is engaged, the second output shaft 25 fixedly supporting the planet carrier 24 rotates at a rotating speed equal to that of the of the planet carrier 24 in a direct drive mode and hence the speed ratio b=1.

The second output shaft 25 is inserted in a bore of a gear 28 supported on the input shaft 2 and is interlocked with the gear 28 by splines. The gear 28 is engaged with a gear 29 supported on the support shaft 3 to transmit the third planetary gear unit 30.

The third planetary gear unit 30 includes a ring gear 31, a sun gear 32 and planet gears, which are helical gears. The sun gear 32 is interlocked with the gear 29 by splines. The ring gear 31 is connected through a one-way clutch 36 and a hydraulic clutch 38 to a fixed casing member such that the same can be restrained from rotation relative to the fixed casing member. A planet carrier 34 supporting the planet pinions 33 is fixedly connected to the third output shaft 35.

A third centrifugal clutch 37 is interposed between the planet carrier 34 and the sun gear 32. The third centrifugal clutch 37 is controlled by flyweights 37a supported on the planet carrier 34 and operated by centrifugal force.

In a state where the hydraulic clutch 38 is engaged and the third centrifugal clutch 37 is disengaged, the sun gear 32 is driven for rotation by the second output shaft 25 to rotate the planet gears 33, so that the planet pinions 33 revolves along the ring gear 31, i.e., an internal gear restrained from rotation in one of opposite directions by the one-way clutch 36, and the planet carrier 34 rotates together with the third output shaft 35. In a state where the third centrifugal clutch 37 of the third planetary gear unit 30 is disengaged, the third output shaft 35 (the planet carrier 34) rotates at a rotating speed lower than that of the rotating speed of the sun gear 32; that is, the speed ratio c=(Output rotating speed)/(Input rotating speed)<1. In a state where the third centrifugal clutch 37 is engaged, the sun gear 32 and the planet carrier 34 are fastened together, and the third output shaft 35 rotates at a rotating speed equal to that of the sun gear 32; that is, the speed ratio c=1. The third centrifugal clutch 37, similarly to the first centrifugal clutch 17, is engaged by the action of the flyweights 37a operated by centrifugal force and is disengaged by thrust exerted on the helical gears.

The reverse drive unit 40 functions in combination with the third planetary gear unit 30. Planet pinions 43 formed integrally with the planet pinions 33 supported on rotating support shafts 34a connected to the planet carrier 34 are engaged with planet pinions 44 supported on support shafts 34b connected to the planet carrier 34, the planet pinions 44 are engaged with a ring gear 45, and the ring gear 45 is connected through a hydraulic clutch 46 to a fixed casing member such that the same can be restrained from rotation relative to the fixed casing member.

In a forward drive mode, the hydraulic clutch 38 is engaged and the hydraulic clutch 46 is disengaged. Consequently, the sun gear 32 drives the planet pinions 33 for rotation, the planet pinions 33 revolve along the ring gear 31, and the planet carrier 34 rotates together with the third output shaft 35.

In a reverse drive mode, the hydraulic clutch 38 is disengaged and the hydraulic clutch 46 is engaged. Consequently, the sun gear 32 drives the planet pinions 33 formed integrally with the planet pinions 43 for rotation. Since the planet pinions 44 are interposed between the planet pinions 43 and the fixed ring gear 45, the planet pinions 44 rotates in the reverse direction and revolve in the reverse direction along the fixed ring gear 45. Consequently, the planet carrier 34 rotates in the reverse direction together with the third output shaft 35.

In the automatic transmission 1, the first planetary gear unit 10 and the first centrifugal clutch 17 form a first module M1, the second planetary gear unit 20 and the second hydraulic clutch 27 form a second module M2, and the third planetary gear unit 30 and the third centrifugal clutch 37 form a third module M3. The first module M1, the second module M2 and the third module M3 are arranged in series. The clutches of the modules M1, M2 and M3 are engaged and disengaged selectively to provide eight speeds including a first to an eighth speed. Table 1 shows the condition of the clutches of the modules M1, M2 and M3 for those eight speeds. In Table 1, the condition of the clutches is represented by speed ratios. The clutches are engaged when the speed ratio is 1, and the same are disengaged when the speed ratio is a, b or c. In Table 1, c<a<1<b and a·b>1.

TABLE 1

| Speed | M1 | M2 | M3 | Drive ratio |
| --- | --- | --- | --- | --- |
| First | a | 1 | c | a . c |
| Second | 1 | 1 | c | c |
| Third | a | b | c | a . b . c |
| Fourth | 1 | b | c | b . c |
| Fifth | a | 1 | 1 | a |
| Sixth | 1 | 1 | 1 | 1 |
| Seventh | a | b | 1 | a . b |
| Eighth | 1 | b | 1 | b |

The engagement and disengagement of the first centrifugal clutch 17 and the third centrifugal clutch 37 are dependent on the respective weights of the flyweights 17a and 37a and thrust exerted on the helical gears. The engagement and disengagement of the hydraulic clutch 27 are controlled for smooth, shockless upshifting and downshifting on the basis of a V-$\theta_{th}$ map showing the relation between engine speed V and throttle opening $\theta_{th}$, and the respective input and output rotating speeds of the modules.

As shown in Table 1, the drive ratio is equal to 1when the automatic transmission 1 is set for the sixth speed; that is, the automatic transmission 1 functions as an overdrive when the same is set for the seventh speed equal to the drive ratio a·b or the eighth speed equal to the drive ratio b. Since the second module M2 capable of establishing the overtop speed ratio b>1is interposed between the first module M1 and the third module M3, the torque capacities of the component parts below the second module M2 may be small and load on the gears, clutches and bearings of the third module M3 and the reverse drive gear unit 40 can be reduced and the multispeed automatic transmission can be formed in a compact, small, lightweight unit.

Since the two-speed second module M2 is interposed between the first module M1 and the third module M1 each including the centrifugal clutch that is engaged and disengaged by the centrifugal force acting on the flyweights and the thrust exerted on the helical gears, respectively, the automatic transmission 1 is basically the same in functions and effects as the conventional automatic transmission in which units corresponding to the first module M1 and the third module M3 are connected directly and differs only in the employment of the second module M2 that can be selectively set for either of the two speeds.

The one-way clutch 26 prevents the reverse rotation of the driving wheels when the hydraulic clutch 27 is engaged. Therefore, the backward movement of the vehicle after the vehicle has stopped in a state where the traveling speed of the vehicle is zero and the throttle opening $\theta_{th}=0°$ during uphill running on an uphill road can be prevented, i.e., the so-called heel stop can be achieved, when the hydraulic clutch 27 is engaged. Since creep stop is achieved without requiring creep control by a torque converter, which is necessary with a vehicle provided with a general automatic transmission, fuel consumption is improved. Since the hydraulic clutch 27 is engaged when the first speed is selected, the vehicle can be smoothly started without changing the condition of the hydraulic clutch 27 and without requiring complicated control operations.

The eight-speed automatic transmission 1 can be changed into a five-speed, six-speed or seven-speed automatic transmission by properly changing the timing of changing the condition of the hydraulic clutch 27. For example, if the hydraulic clutch 27 is disengaged at proper time before the first centrifugal clutch 17 is engaged in upshifting the automatic transmission 1 from the first speed to the second speed, the second speed is skipped and the automatic transmission 1 can be upshifted from the first speed to the third speed. Similarly, the automatic transmission 1 can be upshifted from the fifth speed to the seventh speed, skipping the sixth speed. Thus, the automatic transmission 1 is able to function as a six-speed automatic transmission.

Although the invention has been described as applied to the automatic transmission 1 for the FF vehicle, having the two parallel shafts, i.e., the input shaft 2 and the support shaft 3, the present invention is applicable to an automatic transmission for a front-engine rear-drive (FR) vehicle, having a long input shaft capable of supporting thereon the third module M3 and the reverse drive unit 40 in addition to the first module M1 and the second module M2.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An automatic transmission for a vehicle comprising:
    an input shaft connected to an output shaft of an engine;
    a first planetary gear unit including a helical sun gear, helical planet pinions supported for rotation on a planet carrier, and a helical ring gear, the sun gear or the ring gear being connected to the input shaft, the ring gear or the sun gear being connected through a one-way clutch to a fixed member such that the ring gear or the sun gear can be restrained from rotation relative to the fixed member, the planet carrier being connected to a first output shaft;
    a first clutch interposed between the input shaft and the first output shaft and capable of being engaged by the action of flyweights operated by centrifugal force and of being disengaged by thrust exerted on the helical gears of the first planetary gear unit;

a second planetary gear unit including a sun gear, planet pinions supported for rotation on a planet carrier, and a ring gear, the planet carrier being connected to the first output shaft, the sun gear or the ring gear being connected to a second output shaft, the ring gear or the sun gear being connected through a one-way clutch to the fixed member such that the ring gear or the sun gear can be restrained from rotation relative to the fixed member;

a second clutch interposed between the first and the second output shaft, and being controlled by a control means so as to engage the first and the second output shaft or disengage the first and the second output shaft from each other;

a third planetary gear unit including a helical sun gear, helical planet pinions supported for rotation on a planet carrier, and a helical ring gear, the sun gear or the ring gear being connected to the second output shaft, the ring gear or the sun gear being connected through a one-way clutch to the fixed member such that the ring gear or the sun gear can be restrained from rotation relative to the fixed member; and a third clutch interposed between the second and a third output shaft, and capable of being engaged by the action of flyweights operated by centrifugal force and of being disengaged by thrust exerted on the helical gears of the third planetary gear unit, and the engagement and disengagement of the second clutch with the first and second output shaft controlled by the control means provides smooth and shockless upshifting and downshifting of the automatic transmission, wherein the control means engages the second clutch while the vehicle is stopped.

2. An automatic transmission for a vehicle comprising:

an input shaft connected to an output shaft of an engine;

a first planetary gear unit including a helical sun gear, helical planet pinions supported for rotation on a planet carrier, and a helical ring gear, the sun gear or the ring gear being connected to the input shaft, the ring gear or the sun gear being connected through a one-way clutch to a fixed member such that the ring gear or the sun gear can be restrained from rotation relative to the fixed member, the planet carrier being connected to a first output shaft;

a first clutch interposed between the input shaft and the first output shaft and capable of being engaged by the action of flyweights operated by centrifugal force and of being disengaged by thrust exerted on the helical gears of the first planetary gear unit;

a second planetary gear unit including a sun gear, planet pinions supported for rotation on a planet carrier, and a ring gear, the planet carrier being connected to the first output shaft, the sun gear or the ring gear being connected to a second output shaft, the ring gear or the sun gear being connected through a one-way clutch to the fixed member such that the ring gear or the sun gear can be restrained from rotation relative to the fixed member;

a second clutch interposed between the first and the second output shaft, and being controlled by a control means so as to engage the first and the second output shaft or disengage the first and the second output shaft from each other;

a third planetary gear unit including a helical sun gear, helical planet pinions supported for rotation on a planet carrier, and a helical ring gear, the sun gear or the ring gear being connected to the second output shaft, the ring gear or the sun gear being connected through a one-way clutch to the fixed member such that the ring gear or the sun gear can be restrained from rotation relative to the fixed member;

a third clutch interposed between the second and a third output shaft, and capable of being engaged by the action of flyweights operated by centrifugal force and of being disengaged by thrust exerted on the helical gears of the third planetary gear unit, and the engagement and disengagement of the second clutch with the first and second output shaft controlled by the control means provides smooth and shockless upshifting and downshifting of the automatic transmission; and a reversing mechanism mounted on the third output shaft.

3. The automatic transmission according to either one of claim 1 or 2, wherein the second clutch is a hydraulic clutch.

4. The automatic transmission according to either one of claim 1 or 2, wherein the second clutch is an electromagnetic clutch.

* * * * *